Oct. 30, 1962 R. LAY 3,061,178
MOTOR-DRIVEN PLUNGER-TYPE COMPRESSOR
Filed Sept. 23, 1960 2 Sheets-Sheet 1

Oct. 30, 1962   R. LAY   3,061,178
MOTOR-DRIVEN PLUNGER-TYPE COMPRESSOR
Filed Sept. 23, 1960   2 Sheets-Sheet 2

United States Patent Office 3,061,178
Patented Oct. 30, 1962

3,061,178
MOTOR-DRIVEN PLUNGER-TYPE COMPRESSOR
Robert Lay, Offenbach, Bieber, Germany, assignor to Danfoss, Nordberg, Denmark, a corporation of Denmark
Filed Sept. 23, 1960, Ser. No. 58,069
Claims priority, application Great Britain Sept. 30, 1959
2 Claims. (Cl. 230—58)

The invention relates to a motor-driven plunger-type compressor, particularly for small refrigerators, in which a cylinder and a cylinder head are connected to one another and attached to a support element as one unit. When the unit consisting of cylinder and cylinder head is directly attached to the bearing plate of the motor, a very compact construction of motor and compressor is the result.

In order to effect attachment, the cylinder body was hitherto provided with two laterally projecting feet through which passed the attachment screws engaging the bearing plate. The cylinder head was directly screw-connected to the cylinder afterwards, as an accessory. It was found however that on tightening the screws by which the cylinder was attached to the bearing plate, distortions occurred in the cylinder bore which, on average, amounted to 4 microns. This distortion must be added to manufacturing tolerances (e.g. conicity and ovalization up to 2 microns) so that a clearance between plunger and cylinder of an average 10 microns had to be accepted. Obviously, this clearance must lead to poor operating efficiency.

According to the present invention, the above-mentioned disadvantages are largely eliminated when the cylinder head is attached to the support element and the cylinder supported by the cylinder head. Any distortions will then be confined to the cylinder head where they have no detrimental effect. It is easy to attach the cylinder to the cylinder head by means of screws extending parallel with the cylinder axis so that no distortions need be anticipated in the cylinder. Tests have shown that the cylinder can be fastened in this manner as securely as if it were screwed directly to the bearing plate of the motor.

A particularly reliable fastening is achieved when the cylinder head is provided with lateral extensions partially enveloping the cylinder, in order to increase the area of contact with the support element. This makes it possible, for example, to attach the cylinder head to the support element with more than two screws. It is of particular advantage if these extensions are constructed as sound-absorbing chambers.

A construction according to the present invention had not hitherto been adopted by those skilled in the art, not only because it is usual to attach the main parts of a structure, i.e. in this case the cylinder containing the plunger, directly to the support element, but also because in this case the assembly presents problems not hitherto encountered. This is true in particular with regard to the adjustment of the cylinder clearance, i.e. with regard to the relative position of cylinder and plunger in the upper dead center position. So far it had been possible to fit the plunger and afterwards to mount the cylinder by means of a dial gauge in such a way that the latter would project with its upper edge by a certain amount, for example ¹⁄₁₀ mm.; beyond the plunger in the upper dead center position. This procedure is not feasible with a construction such as proposed by the present invention, because a dial gauge cannot be employed, due to the fact that cylinder and cylinder head are joined to one another before positioning with respect to the plunger.

It was found, however, that in assembling the compressor according to the invention the cylinder clearance can be adjusted far more easily and, above all, more accurately than hitherto. The cylinder and the cylinder head are screw-connected with a feeler gauge interposed between them and this unit is then attached to the support element by means of the screws passing through the cylinder head, with the plunger in its upper dead center position and the feeler gauge making contact with the front surface of the plunger. The feeler gauge is then withdrawn and the screws connecting the cylinder to the cylinder head are tightened. The thickness of the feeler gauge ensures, independently of any instrument reading which must necessarily involve errors, that the same predetermined cylinder clearance is set in every compressor.

In attaching the cylinder head to the support element it is possible, in particular, first to tighten the screws so that they exercise a clamping action, then to bring the plunger into its upper dead center position, and only then to tighten the screws completely. In this case the plunger will have to be brought into its upper dead center position by overcoming the friction between cylinder head and support element; this ensures that firm contact is established between its front face and the feeler gauge.

The term "cylinder head," as used in the present case, is means to comprise all elements which may be employed to cover the cylinder frontally. Such a cylinder head may, of course, also consist of several parts, for example, of a valve plate, gaskets and an outer cap.

It is an object of the invention to provide a compressor in which the manufacturing tolerances of the cylinder bore are the only deviations from the desired dimensions of the cylinder.

Another object of the invention is to provide a method of assembling a compressor having manufacturing tolerances only.

Other objects and a fuller understanding of the invention may be had by referring to the following description and claims, taken in conjunction with the accompanying drawings, in which:

Figure 1:
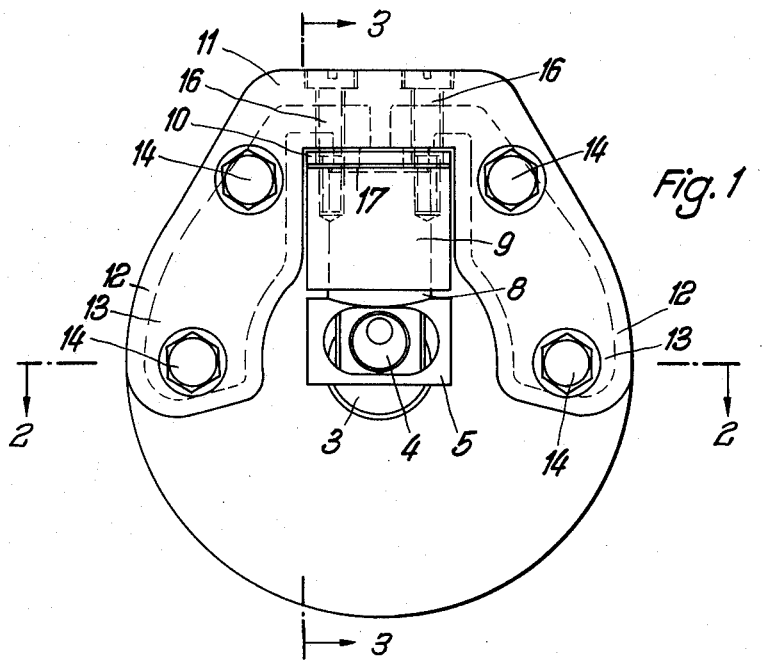
FIGURE 1 is a bottom view of a small motor-driven plunger-type compressor according to the invention.
Figure 2:
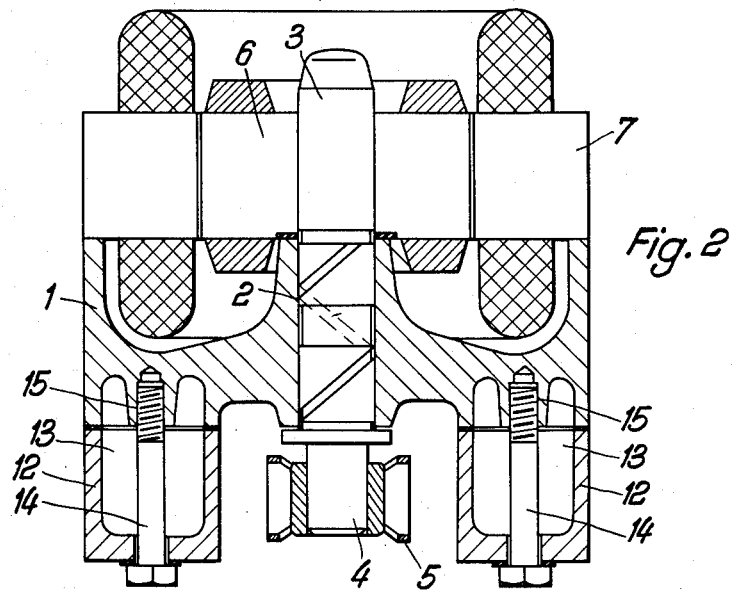
FIGURE 2 is a horizontal cross-section taken along line 2—2 of FIGURE 1.
Figure 3:
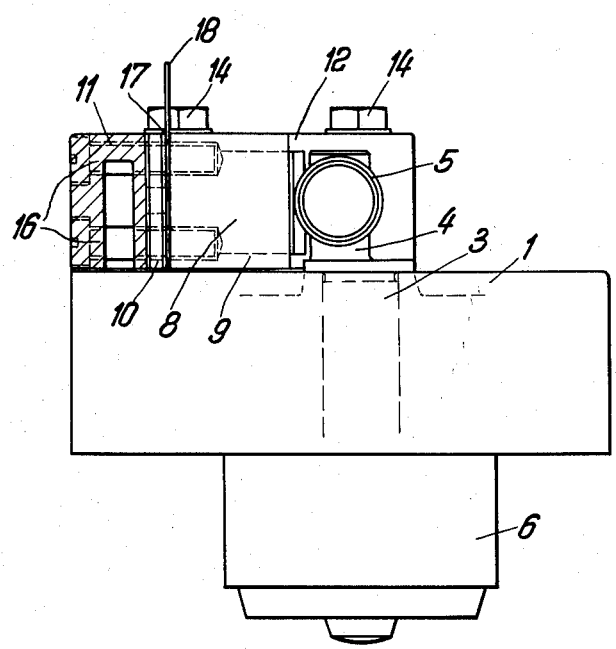
FIGURE 3 is a vertical cross-section taken along line 3—3 of FIGURE 1.

Referring to the drawings a bearing plate 1 is the main support element of a unit consisting of motor m and compressor c. A bore 2 in the bearing plate supports the shaft 3 which at one end has an eccentric 4 engaging a yoke 5 and, at the other end, the rotor 6. Encircling the rotor is the stator 7. Through the yoke 5, the eccentric 4 drives the plunger 8 accommodated in the cylinder 9. The cylinder is closed at the top by the valve plate 10 and the cylinder head 11. The cylinder head 11 is provided with lateral extensions 12 which envelope the cylinder, and in which sound-absorbing chambers 13 are provided.

According to the invention the cylinder head 11 with extensions 12 is directly attached to the bearing plate 1. This is achieved by means of four screws 14 which engage suitable bores 15 in the bearing plate. A very satisfactory connection is achieved due to the comparatively large area of contact and the quadruple screw-connection. The cylinder 9 itself is held to the cylinder head 11 by means of the screws 16, and is no longer directly attached to the bearing plate 1, whereby the distortions formerly caused are eliminated. The outer cross section of the cylinder 9 is a square, one screw 16 being provided in each corner of said square.

Assembly of the apparatus is effected as follows: First the cylinder 9 is screwed to the cylinder head 11 by means of screws 16, with the valve plate 10 interposed there-between, there being interposed at the point of abutment 17, between the upper edge of cylinder 9 and the valve plate 10, a feeler gauge 18 of pre-determined thickness, for example 1/10 mm., which can just be withdrawn against friction.

Then the unit, thus screw-connected, is attached to the bearing plate 1 by means of the screws 14. The screws 14 are tightened sufficiently to permit the unit to shift only when a certain friction is overcome. The plunger 8 is then pushed into its upper dead center position. During this operation its front face makes contact with the feeler gauge and—assuming that the alignment is not correct—presses the entire unit, consisting of cylinder head, valve plate and cylinder, in an outward direction. Only then are the screws 14 tightened. If the feeler gauge 18 is now withdrawn from the point of abutment 17 and the screws 16 tightened, then the cylinder 9 will move towards the cylinder head by an amount pre-determined by the thickness of the feeler gauge. In this way, an identical cylinder clearance is set in every compressor of one and the same series, without any likelihood of measuring errors.

Although the invention has been described with a certain degree of particularity, it is understood that the present disclosure is only by way of example and that numerous changes in the details of construction and the combination and arrangement of parts may be resorted to without departing from the spirit and the scope of the invention as hereinafter claimed.

What I claim and desire to secure by Letters Patent is:
1. A motor-driven plunger-type compressor in which the motor has a shaft rotatably supported by a bearing plate, said compressor being particularly for use in small refrigerators and comprising: a cylinder having a first and second end and a longitudinal axis; a cylinder head for closing the first end of the cylinder; first fastening means for attaching the cylinder to the cylinder head, said first fastening means extending parallel to the longitudinal axis of the cylinder; second fastening means for securing the cylinder head to said bearing plate with the second end of the attached cylinder adjacent an end of said shaft; a plunger reciprocable in said cylinder; eccentric driving connections between said shaft and plunger to reciprocate said plunger in said cylinder; said cylinder head having lateral extensions partially enveloping the cylinder for enlarging the area of contact with the bearing plate to improve engagement therewith, and said extensions being transversely normal to the motor shaft for bracing the cylinder against the lateral forces of the eccentrically driven plunger.

2. A motor-driven plunger-type compressor, according to claim 1, in which the extensions are hollow to provide sound absorbing chambers.

References Cited in the file of this patent
UNITED STATES PATENTS

| 1,035,804 | Mintz | Aug. 13, 1912 |
| 2,836,349 | Shelford | May 27, 1958 |

FOREIGN PATENTS

| 78,963 | Austria | Nov. 10, 1919 |